United States Patent Office 3,409,655
Patented Nov. 5, 1968

3,409,655
ALUMINUM N-(3-TRIFLUOROMETHYLPHENYL) ANTHRANILATE
Teruya Seki, Tokyo, and Yoshiaki Watanabe, Saitama, Japan, assignors to Taisho Pharmaceutical Co., Ltd., Tokyo, Japan
No Drawing. Filed Feb. 17, 1965, Ser. No. 433,513
Claims priority, application Japan, Feb. 17, 1964, 39/8,181
1 Claim. (Cl. 260—448)

ABSTRACT OF THE DISCLOSURE

Aluminum N-(3-trifluoromethylphenyl) arthranilate of the formula

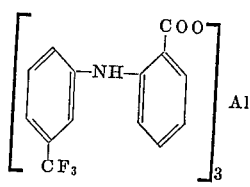

is disclosed. The material is useful as an anti-inflammatory agent.

---

This invention relates to a novel anthranilic acid derivative. More particularly, this invention relates to aluminum N-(3-trifluoromethylphenyl) anthranilate

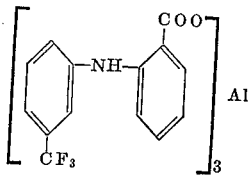

which is useful as an anti-inflammatory agent.

N-(3-trifluoromethylphenyl) anthranilic acid has heretofore been used as an anti-inflammatory agent. However, it is bound up with desirable side effects in the gastro intestinal tract, and frequently causes diarrhea.

The present invention is directed to the obviation of this disadvantage and this goal has been realized by the aluminum N-(3-trifluoromethylphenyl) anthranilate of the present invention, which has no such side effect, being less toxic than the free acid.

The compound of the present invention is prepared as follows:

1 mole of N-(3-trifluoromethylphenyl) anthranilic acid is added to 0.98 mole of sodium hydroxide in 4 liters water with stirring. After standing overnight, the reaction mixture is filtered. The pH of the filtrate is adjusted to 8 to 8.5 at a temperature of 15 to 20° C. To the filtrate 1 mole of aluminum chloride dissolved in water is added slowly with stirring, and then the precipitated aluminum N-(3-trifluoromethylphenyl) anthranilate is collected by suction filtration and dried.

The resulting aluminum N-(3-trifluoromethylphenyl) anthranilate is a pale yellow powder, tasteless and odorless.

It is insoluble in water, soluble in methanol, ethanol, acetone, chloroform and benzene and shows an indefinite melting point.

The above mentioned procedure is based on the fact that ¼ mole aqueous solution of sodium hydroxide in adding the equivalent of N-(3-trifluoromethylphenyl) anthranilic acid has the pH of 8.3 at 15 to 20° C.

The N-(3-trifluoromethylphenyl) anthranilic acid used in the preparation of the compound of this invention can be prepared as described in the Journal of the Chemical Society, p. 33 (1948).

For testing as to toxicity:

100 mg./kg. (milligrams per kilogram) of aluminium N-(3-trifluoromethylphenyl) anthranilate is administered daily to rats orally for one month; this results in a decrease in their body weight, but none of the test rats died. On the other hand, when 100 mg./kg. of N-(3-trifluoromethylphenyl) anthranilic acid is administered according to the same procedure, it also causes decrease in the growth rate of the rats, but it also results in the death of 40% of the test rats.

The $LD_{50}$ (orally in mice):

N-(3-trifluoromethylphenyl) anthranilic acid: 850 mg./kg.

Sodium N-(3-trifluoromethylphenyl) anthranilate: 580 mg./kg.

Aluminum N-(3-trifluoromethylphenyl) anthranilate: 940 mg./kg.

The anti-inflammatory activities of N-(3-trifluoromethylphenyl) anthranilic acid and aluminum N-(3-trifluoromethylphenyl) anthranilate:

(1) Measuring the inhibition of edema produced acutely by injection of 1% carrageenin solution into the plantar surface of the hind paw of rats:

N-(3-trifluoromethylphenyl) anthranilic acid: 50 mg./kg. orally; effective.

Aluminum N-(3-trifluoromethylphenyl) anthranilate: 50 mg./kg. orally; effective.

Aluminum N-(3-trifluoromethylphenyl) anthranilate is as effective as N-(3-trifluoromethylphenyl) anthranilic acid.

(2) Measuring the inhibition of ultra-violet injury to quinea pigs. (Wilhelm's method):

N-(3-trifluoromethylphenyl) anthranilic acid: 15 mg./kg. orally; 100% inhibited.

Aluminum N-(3-trifluoromethylphenyl) anthranilates: 15 mg./kg. orally; 95% inhibited.

(3) Measuring the inhibition of granuloma formation caused by subcutaneous implantation of cotton pellets into rats. (R. Meier's method):

N-(3-trifluoromethylphenyl) anthranilic acid: daily 30 mg./kg. orally or one week; effective.

Aluminum N-(3-trifluoromethylphenyl) anthranilate: daily 30 mg./kg. orally for one week; effective.

The effectiveness of aluminum N-(3-trifluoromethylphenyl) anthranilate is equal to that of N-(3-trifluoromethylphenyl) anthranilic acid.

(4) Measuring the inhibition of granuloma formation caused by intravenous injection of 0.5% croton oil into rats. (H. Selye's method):

N-(3-trifluoromethylphenyl) anthranilic acid: daily 50 mg./kg. orally for one week; 69.4% inhibited.

Aluminum N-(3-trifluoromethylphenyl) anthranilate: daily 50 mg./kg. orally for one week; 71.4% inhibited.

The new compound of the invention is preferably administered orally, for example in the form of dosage unit tablets prepared in per se conventional manner with tabletting adjuvants such as are usually employed in making pharmaceutical tablets for oral use. Appropriate daily dosage is 600–750 milligrams for initial dose and 200–300 milligrams for maintenance dose to adults, which may be administered as a single tablet or by way of a suitable number of tablets depending upon their content of said new compound.

The following example is further illustrative of the invention.

Example

A mixture of 140.5 grams (0.5 mole) of N-(3-trifluoromethylphenyl) anthranilic acid and 19.5 grams (0.49 mole) of sodium hydroxide in 2 liters of water is stirred for 8 hours at room temperature (15 to 20° C.) After standing overnight, the excess of N-(3-trifluoromethylphenyl) anthranilic acid is filtered off and the pH of this filtrate adjusted, if necessary, to 8 to 8.5. To the said filtrate, 40 grams (0.5 mole) of aluminum chloride ($AlCl_3 \cdot 6H_2O$) in 500 milliliters of water is added dropwise with mechanical stirring.

The precipitae is collected by suction filtration, washed with water until the washings become neutral on litmus paper and dried.

The thus-prepared aluminum N-(3-trifluoromethylphenyl) anthranilate amounts to 138.5 grams.

Pale yellow powder.

Analysis.—$C_{42}H_{27}AlF_9N_3O_6$: Calcd.: C, 58.13%; H, 3.14%; N, 4.84%. Found: C, 58.1%; H, 3.36%; N, 4.68%.

Adjustment of the aforesaid filtrate to pH 8–8.5, if the pH shows more than 8.5, is effected by the addition of requested amounts N-(3-trifluoromethylphenyl) anthranilic acid and the pH does not show less than 8.0 because the said free acid is insoluble in water.

Having thus disclosed the invention, what is claimed is:

1. Aluminum N-(3-trifluoromethylphenyl) anthranilate.

References Cited

UNITED STATES PATENTS

| | | | |
|---|---|---|---|
| 1,447,501 | 3/1923 | Altwegg | 260—448 B |
| 2,640,842 | 6/1953 | Weidenheimer | 260—439 |
| 3,035,091 | 5/1962 | Wygant | 260—448 XR |
| 3,144,387 | 8/1964 | Jones. | |
| 3,207,779 | 9/1965 | Cutler et al. | 260—448 XR |

TOBIAS E. LEVOW, *Primary Examiner.*

H. M. S. SNEED, *Assistant Examiner.*